United States Patent [19]

Yoshida et al.

[11] Patent Number: 5,505,815

[45] Date of Patent: Apr. 9, 1996

[54] APPARATUS FOR MOLDING NONWOVEN WEB INTO MOLDED FORM

[75] Inventors: Makoto Yoshida, Ibaraki; Motohiro Kitagawa, Fukui; Akira Kato, Nishinomiya; Shigeo Koono, Ibaraki; Nobuo Takahashi, Ikoma, all of Japan

[73] Assignee: Teijin Limited, Osaka, Japan

[21] Appl. No.: 268,518

[22] Filed: Jun. 30, 1994

Related U.S. Application Data

[62] Division of Ser. No. 91,926, Jul. 16, 1993, abandoned.

[30] Foreign Application Priority Data

Jul. 16, 1992 [JP] Japan .................................. 4-212078

[51] Int. Cl.⁶ .................................................. B32B 31/00
[52] U.S. Cl. ........................ 156/512; 156/353; 156/361; 425/305.1; 425/405.1
[58] Field of Search ........................ 156/245, 62.2, 156/62.6, 62.8, 285, 204, 433, 227, 264, 353, 361, 363, 500, 512; 264/257, 258, 108, 511, 112, 113; 425/122, 405.1, 405.2, 81.1, 83.1, 305.1; 19/148, 157, 160, 163, 301, 302; 28/289

[56] References Cited

U.S. PATENT DOCUMENTS

| | | | |
|---|---|---|---|
| 1,003,114 | 9/1911 | Kirchhoff . | |
| 2,325,265 | 7/1943 | Millar . | |
| 3,351,992 | 11/1967 | Carter . | |
| 3,382,643 | 5/1968 | Hullhorst et al. | 53/434 |
| 3,546,846 | 12/1970 | Sens | 53/433 |
| 3,645,814 | 2/1972 | Knoepfler et al. . | |
| 4,208,238 | 6/1980 | August et al. | 156/523 |
| 4,696,707 | 9/1987 | Lewis et al. . | |
| 4,910,064 | 3/1990 | Sabee | 156/62.6 |
| 5,169,580 | 12/1992 | Marcus | 264/126 |
| 5,183,708 | 2/1993 | Yoshida et al. . | |
| 5,294,392 | 3/1994 | Marcus | 264/118 |

FOREIGN PATENT DOCUMENTS

| | | |
|---|---|---|
| 250673 | 1/1988 | European Pat. Off. . |
| 291189 | 11/1988 | European Pat. Off. . |
| 1005829 | 2/1956 | Germany . |
| 321903 | 12/1989 | Japan . |

OTHER PUBLICATIONS

Derwent Abstract of JP 1 321 903 (Kuraray KK) (27 Dec. 1989).

Primary Examiner—Geoffrey L. Knable
Attorney, Agent, or Firm—Armstrong, Westerman, Hattori, McLeland & Naughton

[57] ABSTRACT

A molded cushioning article is made by stuffing a bulky, tape-form nonwoven web such as sliver in a mold cavity and thereafter heat-treating the thus-formed molded form to fusion-bond intersecting points of fibers. Stuffing of the tape-form nonwoven web is effected by laying and superposing it in to-and-fro movements on a molding surface of a mold permeable to air with a space on a backside of the molding surface being kept under reduced pressure. The apparatus used has (a) means for feeding the tape-form nonwoven web into the mold, (b) a mold permeable to air, (c) a mold-supporting frame, (d) suction means for keeping the backside space under reduced pressure, (e) leans for successively changing a positional correlation between means (a) and the molding surface, and (f) heat-treating means for fibers to be fusion-bonded.

8 Claims, 10 Drawing Sheets

APPARATUS FOR MOLDING NONWOVEN WEB INTO MOLDED FORM

This is a division of application Ser. No. 08/091,926, filed Jul. 16, 1993, now abandoned.

BACKGROUND OF THE INVENTION

1. Field of the Invention

This invention relates to a method for molding a tape-form nonwoven web into a molded form and an apparatus therefor. It also relates to a method for making a molded cushioning article from the molded form of a tape-form nonwoven web, and an apparatus therefor.

The molded cushioning article is useful as a cushioning material for seats of vehicles, furniture such as chairs, or the like.

2. Description of the Related Art

Methods hitherto known for manufacturing cushioning materials for seats of vehicles, furniture or the like include: that urethane is foamed and shaped into a predetermined form in a mold, thereby providing an urethane foam cushioning; that a fiber web material is applied with a liquid adhesive, and then packed in a mold wherein the adhesive is cured (for example, Japanese Unexamined Patent Publication No.62-102712); that air flow accompanied with staple fibers having incorporated therein heat-bondable fibers are injected into a mold where the staple fibers are thermoformed (for example, Japanese Unexamined Patent Publication No. 3-121091); and that, instead of the conventional wadding, a sliver composed of only crimped staple fibers serving as a matrix is shaped into a spiral or wavy form and filled into a covering material, or the sliver is adhered to a cloth to improve the compression chracteristics or other properties of cushioning articles (Japanese Unexamined Utility Model Publication No.49-9512 and Japanese Unexamined Patent Publication No.50-70165).

However, the manufacturing of urethane foam necessitates troublesome handling of chemicals used, and sometimes needs use of freon thereby causing a problem of an environmental pollution. Also, in order to obtain urethane foam cushioning articles molded in a uniform shape, a liquid mixture of a polyurethane-forming monomer and a foaming agent, when injected into a cavity of a closed mold of a predetermined shape and foamed therein, needs to be well extended over the whole mold cavity while being foamed. Hence, the mold is required to have a precise shape with even strictly defined positions of apertures through which extra urethane is discharged. Also, the liquid mixture generally cannot be injected in a manner such that the liquid is directed separately for each of specific parts of the mold, so that the hardness of the cushioning article varies correspondingly to the stress applied to the seat part of the cushion or the hardness therof varies locally as the seating part being soft and the peripheral part being hard. Therefore, a molded seat cushion cannot be obtained which is superior in load supporting efficiency, comfort and shape-keeping properties. Further, since the urethane foam cushion is structured with a uniform polymeric foam shows such a particular property that it feels lard when initially seated and thereafter the urethane foam becomes indented drastically due to lowered modulus from quick extension of collapse of cells. Hence, the urethane foam cushion has a poor cushioning efficiency and feels easily flattened in use. Also, the urethane foam is likely to be formed with films among the cells, rendering the air-permeability thereof poor and making the cushion easily stuffy. Therefore, the urethane foam is not desirable as a cushioning material. Further, since urethane polymers are soft and foamed, the urethane foam requires a higher density to have resistance against compression, and that urethane is easily affected by humidity and light to be deteriorated of physical properties. In these days, particularly, the urethane foam suffers such a problem of environmental pollution that the urethane foam when discarded after use cannot be burnt due to evolution of black smoke and poisonous gas and is hard to be recycled, so that it is usually buried under the ground.

With the manufacturing method for a cushioning article in which a fiber web is first applied with a liquid adhesive and packed in the mold for curing and molding, the operation is carried out in a wet process, resulting in poor working environment, particularly in use of a solvent. Also, it cannot be avoided that in packing the fiber web previously applied with an adhesive in the mold it is molded in the state of being compressed by adhesion or a similar manner, or the adhesive is applied non-uniformly. Furthermore, fibers of the web are hard to move and hard to be entangled to one another at joints of adjacent webs or between adjacent layers of webs since they are wet. As a result the web layers are adhered to one another weakly. The method has also problems of degradation of product quality due to contamination of the mold, and a higher poduction cost and a poor productivity due to the fact that handling the fiber web is difficult to be mechanized and necessarily requires man-power.

With the method wherein an air flow accompanied with staple fibers having incorporated therein heat-bondable fibers are injected, into a mold where the staple fibers are thermoformed for providing cushion product, the fibers must be uniformly scattered in the air flow injected into the mold. However, when the fiber concentration in the air flow is low, it takes a long time for a predetermined amount of fibers to be injected, leading to a problem of a poor productivity. The fibers when increased in concentration are entangled to one another due to crimp of the fibers to become lumps of fibers which, when injected, cause undersirable nonuniformity in density of fibers in the cushion structure. Reducing the crimping degree of fibers to avoid the above problems leads to a problem that the injected fibers do not have sufficient bulkiness, and increasing the smoothness of fiber surfaces is likely to have a problem of insufficient adhesion in thermoforming process.

Further important problems arise in the above method as follow. The staple fibers are injected in the mold by a feeding fan or the like while being separated by a card or a fiber opener. When the staple fibers are injected into a covering material or mold of a complicated shape, the fibers along with air flow enter the mold or covering material, while flowing with a straight-line motion, so that the wadding Of fibers is hard to be controlled of weight for specific parts of the molded form. Also, the method uses a long passage of feed from the card or opener to the injecting point into the mold and, hence, it takes time to control weight of the stuffing in the feeding course or to stop and start feeding the fibers.

With the method of shaping a sliver into a spiral or wavy form and forming it in a sheet-like configuration, there is provided no adhesion among fibers or slivers to cause a formed product to be easily collapsed, resulting in poor compression durability. Also, the formed product is hard to be partially given special shape or partially controlled of density, thereby merely providing flat-form products. Hence, it does not provide a cushioning material for seats of vehicles or funiture such as being superior in comfort in use based on an improved fitting efficiency to human body and weight-supporting efficiency obtained by partially giving a special shape to the cushioning material or partially varying the hardness thereof. Also, in shaping the sliver into a spiral form, since the sliver itself is superposed on one another and spiraled, it causes gaps among specific parts of the sliver or intersecting parts of the slivers to have a higher density than the rest. The sliver when shaped into a wavy form is likely to have gaps at the folded parts and fibers are arranged much in the direction of being compressed, so that the resulting cushioning material easily buckles and has a low durability. Also, the sliver to be shaped into a wavy form must be combined with a covering material or a plain sheet in molding and, thus, there are great limitations to manufacturing conditions, kinds of molded forms and productivity.

SUMMARY OF THE INVENTION

A primary object of the present invention is to provide a method and apparatus for making a molded cushioning article, which has a locally and freely varied density and shape, an improved fittingness to human body or other objects of complicated shapes, an improved load-supporting efficiency, good compression properties such that the cushioning article is soft initially when compressed and exhibits an increasing resistance correspondingly to compression of the cushioning article, a good compression durability and a high air-permeability so as not to be stuffy, and which can be manufactured under a good working environment without causing nonuniformity in processing but with a high productivity through a mechanized system.

In one aspect of the present invention there is provided a method for molding a bulky nonwoven web in the form of a tape into a molded form having a shape corresponding to a cavity of a mold by stuffing the tape-form nonwoven web in the mold cavity, characterized in that the stuffing of the tape-form nonwoven web is effected by laying and superposing the tape-form nonwoven web in to-and-fro movements on a molding surface of a mold made of a structural material permeable to air with a space on a backside of the molding surface being kept under a reduced pressure whereby the tape-form nonwoven web laid and superposed thereon is attracted onto the molding surface by air suction.

The tape-form nonwoven web used in the molding method is preferably a mixture of a crimped staple fiber serving as a matrix and a heat-bondable staple fiber which comprises a polymer having a melting point lower than that of a polymer constituting the crimped staple fiber. The lower-melting-point fiber is exposed on at least part of the surface of the heat-bondable fiber.

The tape-form nonwoven web is preferably a sliver having a bulkiness of 30 to 100 cm$^3$/g and a section modulus K (K=W/D where W is an apparent width of the sliver and D an apparent thickness of the same) of 2 to 10. The polymer constituting the crimped staple fiber is preferably a polyethylene terephthalate polymer, a polybutylene terephthalate polymer or a polycyclohexylmethylene terephthalate polymer. Also, the polymer having a melting point lower than that of the polymer constituting the crimped staple fibers is preferably a thermoplastic elastomer.

In another aspect of the present invention there is provided a method for manufacturing a molded cushioning article, which comprises heat-treating the molded form of the tape-form nonwoven web, made by the above-mentioned method, to melt a portion of fibers forming the tape-form nonwoven web so as to fusion-bond the fibers among others at intersecting points thereof.

The tape-form nonwoven web used in the heat-treatment of the molded form of the tape-form nonwoven web is preferably a mixture of a crimped staple fiber serving as a matrix and a heat-bondable staple fiber which comprises a polymer having a melting point lower than that of a polymer constituting the crimped staple fiber, and the molded form is subjected to the heat-treatment at a temperature equal to or higher than the melting point of the lower-melting-point polymer and lower than the melting point of the polymer constituting the crimped staple fiber, whereby only the lower-melting-point polymer is melted to fusion-bond the intersecting points of the crimped staple fiber and the heat-bondable staple fiber. It is preferable that, before the molded form is subjected to the heat-treatment, a pressing mold lid permeable to air is placed on the exposed surface of the molded form, and the heat-treatment is carried out by applying hot air. It is also preferable that, before the molded form is subjected to the heat-treatment, a sheet-form fibrous material for reinforcing and supporting the molded form is applied on an exposed surface of the molded form which surface makes a rear surface of the resulting molded cushioning article.

In yet another aspect of the present invention there is provided an apparatus for molding a bulky nonwoven web in the form of a tape into a molded part, which comprises:

(a) means for transferring the tape-form nonwoven web to feed the same into a mold defined hereunder, (b) a mold having a molding surface, which is made of a structural material permeable to air and is positioned below the tape-form nonwoven web-feeding means (a), (c) a frame supporting the air-permeable mold (b), (d) suction means provided in the frame (c) for keeping a space on a backside of the molding surface of the air-permeable mold (b) under a reduced pressure, and (e) means for successively changing a positional correlation between the tape-form nonwoven web-feeding means (a) and the molding sur face of the mold (b).

Preferably, the tape-form nonwoven web-feeding means (a) comprises at least two sets of nip rolls spaced each other in the transferring direction of the tape-form nonwoven web, and the nip roll set at the upstream side can be intermittently reduced in the surface velocity with respect to the other nip roll set at the downstream side or freely stopped. Also, the tape-form nonwoven web-feeding means (a) is preferably supported in a fixed state on an arm of a robot through a supporting frame for the tape-form nonwoven web-feeding means(a). The air-permeable mold (b) is preferably a metal wire mold having a number of perforations, or a molded product of a punched plate or metal gauze and may generally have a three-dimensionally curved surface. The frame (c) is preferably a box-shaped casing which is open only at its side confronting the tape-form nonwoven web-feeding means. The means (e) for successively changing that positional correlation is desirably mounted on a stand which supports the tape-form nonwoven web-feeding means (a) in a fixed state.

In still another aspect of the invention, there is provided an apparatus for manufacturing a molded cushioning article, wherein a bulky nonwoven web in the form of a tape is molded into a molded form and thereafter the molded form is fabricated to the molded cushioning article, which comprises, in addition to the means (a) to (e) constituting the tape-form nonwoven web-molding apparatus as above, a heat-treating means (f) for causing a part of the fibers of the molded form to be fusion-bonded. Preferably, the heat-treating means is that utilizing hot air, such as hot-air oven of the type leaving the molded form at rest or of the type provided therein with a conveyer on which the molded form is to be placed. The heat-treatment means is preferably freely placed at an opening part of the box-shaped casing.

The method for molding the tape-form nonwoven web into a molded form, the method for manufacturing a molded cushioning article, and the apparatuses for these methods according to the present invention will now be described in detail with reference to the accompanying drawings.

BRIEF DESCRIPTION OF THE DRAWINGS

In the accomanying drawings.

DESCRIPTION OF THE PREFERRED EMBODIMENTS

The tape-form nonwoven web used for making the molded form and the molded cushioning article is preferably a mixture of a crimped staple fiber serving as a matrix and a heat-bondable staple fiber which comprises a polymer having a melting point lower than that of a polymer constituting the crimped staple fiber, The tape-form nonwoven web is preferably in the form of sliver. The methods and apparatuses of the present invention will be described hereunder by way of examples using a sliver which is a most typical representative of the tape-form nonwoven web.

To prepare the sliver composed of a crimped staple fiber and a heat-bondable fiber of a low melting point, it is most preferable to blend the crimped staple fiber and the heat-bondable fiber and open the blend by a card or opener to provide a sliver or the like. Alternatively, webs of a broad width drawn from a card, as it is or superposed upon another, may be cut into strips or tape forms, or broad webs of deposited staple fibers blown by air may be cut into strips or tape forms.

Figure 1:
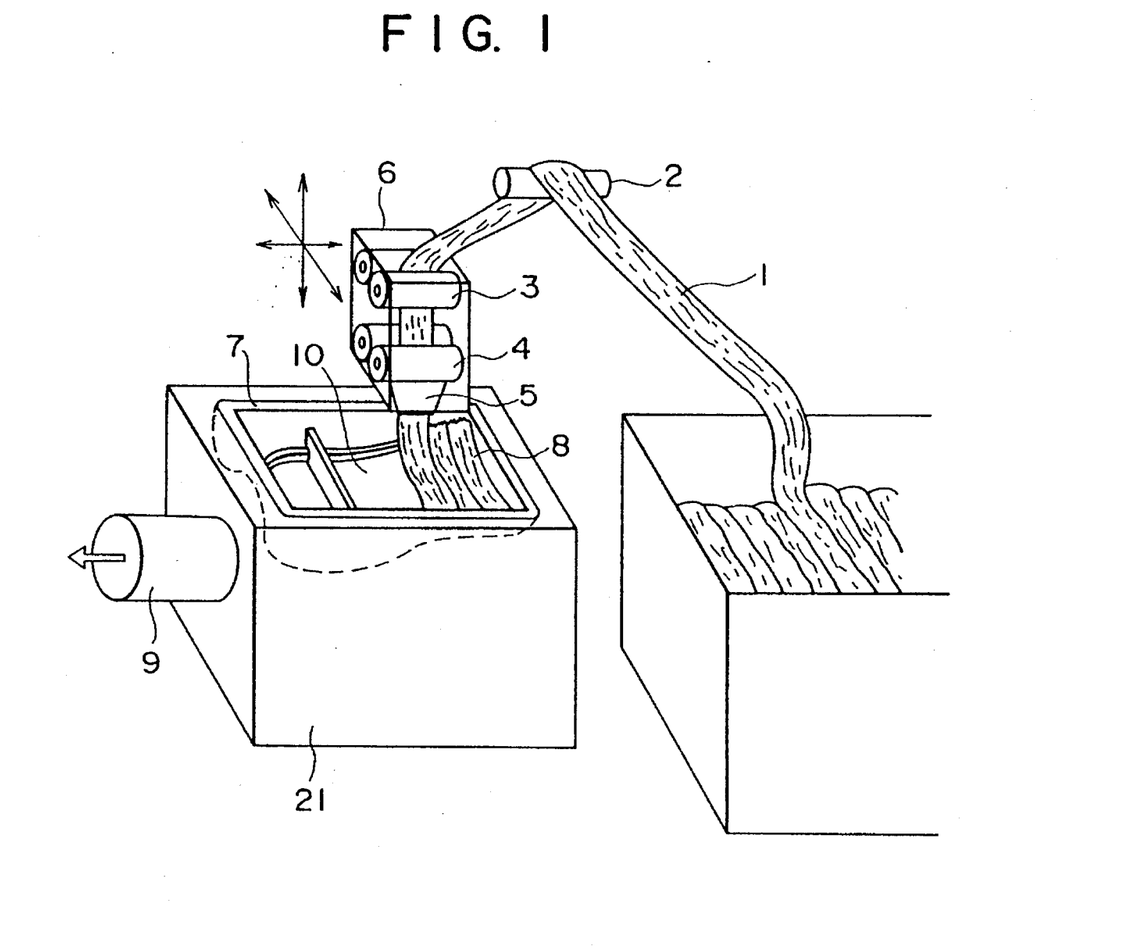
FIG. 1 is a perspective view showing a principal part of a method and an apparatus for making a molded form from a tape-form nonwoven web.
Figure 2:
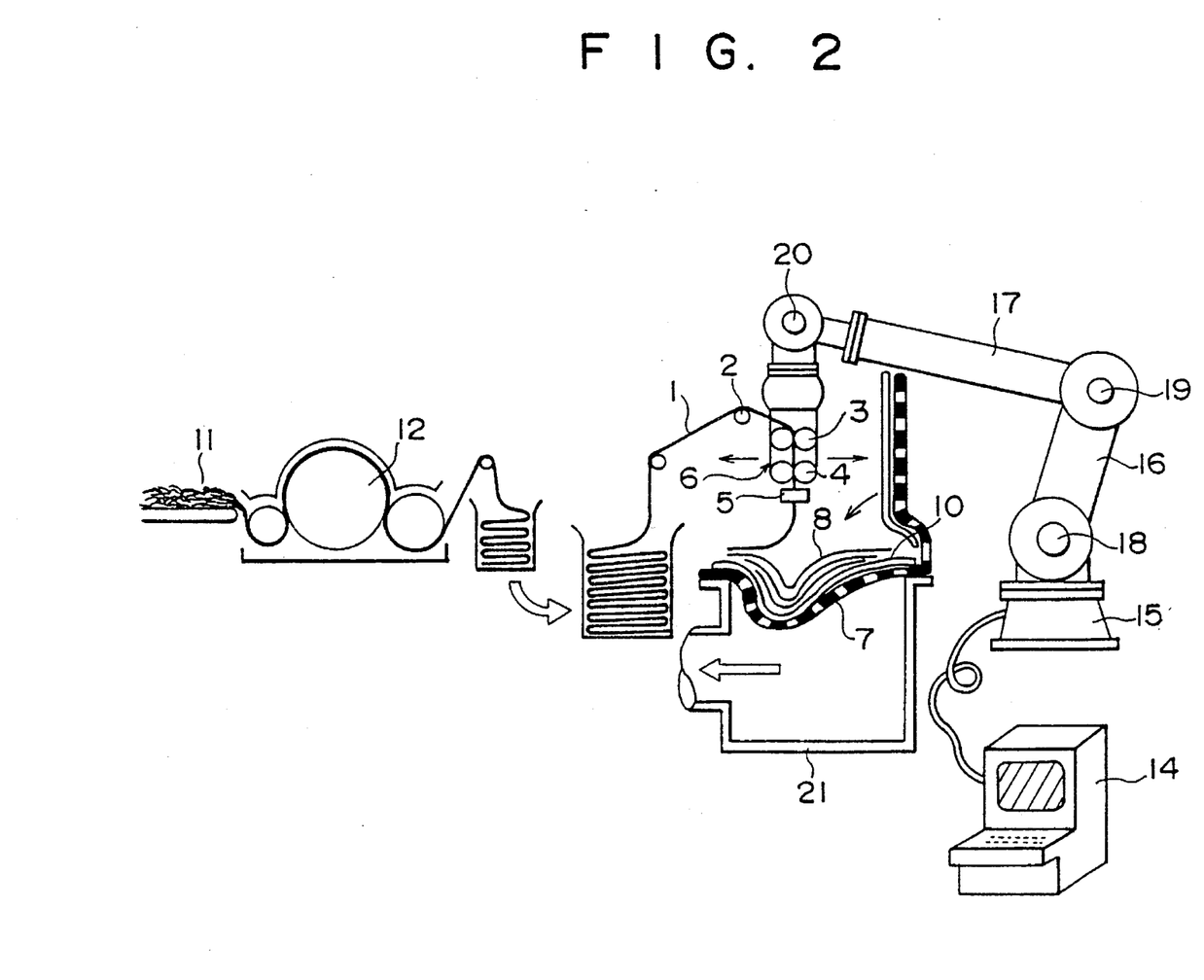
FIG. 2 is a schematic diagram outlining a processes of making a tape-form nonwoven web and its molded form.

FIG. 1 is a perspective view for illustrating the process and device wherein the tape-form nonwoven web such as sliver is laid and superposed on the molding surface of a mold to be shaped into a molded form of the shape corresponding to the molding surface. FIG. 2 is a schematic explanatory view showing the outline of the process wherein a mixture of a crimped staple fiber and a heat-bondable fiber is opened by a card to prepare a sliver, and a molded form is produced from the sliver.

In FIG. 2, a mixture 11 of a crimped staple fiber and a heat,bondable fiber is fed to a card 12 to make a sliver. As shown in FIGS. 1 and 2, the sliver 1 is moved through an idle guide 2 to a feeding means 6, directed downward by an ejective nozzle 5 mounted on the lower end of the feeding means 6, and laid and superposed on a molding surface 10 of a mold 7.

The feeding means 6 with the ejective nozzle 5 is freely movable forward, backward, leftward, rightward, upward and downward and in any composite directions of these by operation of a multi-joint robot. The multi-joint robot comprises a control device 14, a stand 15, a plurality of arm elements 16, 17 and a plurality of links 18, 19, 20. On a wrist part of an arm comprising the arm elements and links is mounted the sliver feeding means 6 through a supporting frame. The robot preferably shows high reliability in cutting accuracy for the sliver, positioning and tracing accuracy for the feeding means and operates at a high speed.

The sliver may be laid and superposed on the molding surface of the mold in a manner such that a long sliver is continuously turned on the molding surface with one stroke, i.e., without cutting. When the folding angles at the turning points are small, a resultant superposed product is not so problematic. When the folding angles are larger, for example, 180° to cause the sliver to be folded in the completely reversed direction the sliver may have gaps at the folded portions or a high density locally and, thus a uniform superposed product cannot be expected. Hence the sliver is preferably cut to a length shorter than the length of the molding surface by a cutting mechanism provided to the feeding means 6 and then superposed on the molding surface.

As the cutting mechanism may be used a mechanism having a cutter blade (not shown) mounted at utmost end of the feeding means 6. A more preferable feature of the cutting mechanism may comprise, as shown in FIGS. 1 and 2, at least two sets of nip rolls 3, 4 spaced from each other in the transferring direction of the sliver 1, and the nip roll set 3 at the upstream side can be intermittently reduced in the surface velocity with respect to the other nip roll set 4 at the downstream side or freely stopped, so that the sliver 1 is drawn to be cut by the difference between the surface velocities of the nip roll set 3 and 4.

Figure 3:
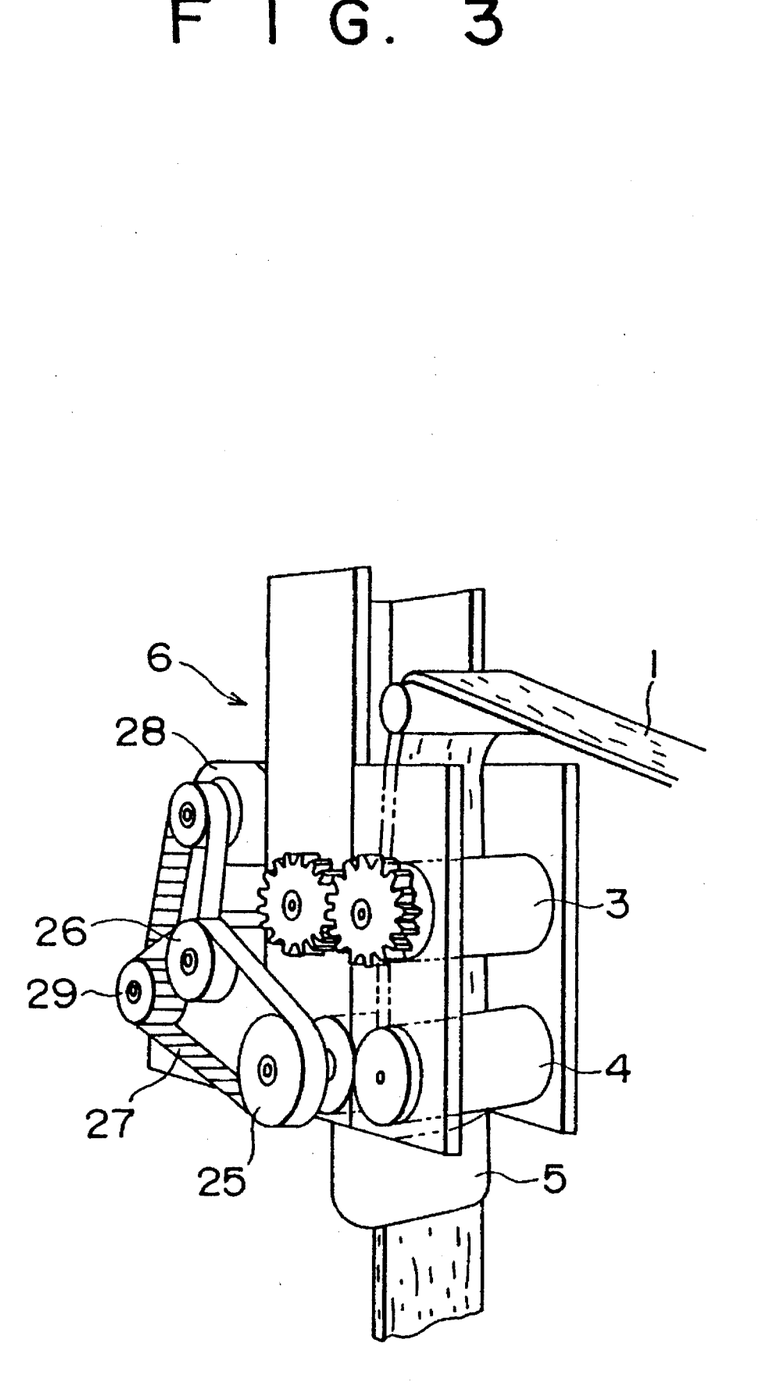
FIG. 3 is a perspective view of a tape-form nonwoven web-feeding means.

FIG. 3 shows details of the feeding means 6 having two sets of nip rolls 3 and 4. The nip roll sets 3 and 4 have a rubber lining and grasp or hold the sliver between each pair of rolls. The driving force of a motor is transmitted from a motor shaft 29 to the nip roll set 4 through a timing belt 27 and a timing pulley 25. Note that reference numeral 26 is a tension pulley. The driving force is transmitted also to the nip roll set 3 at the upstream side in a similar manner, which course of transmission is not shown. Driving by the motor is intermittently stopped by the operation of an electromagnetic clutch 28 to stop the upstream side nip roll set 3, i.e., largely reduce the surface velocity of the nip roll set 3 to cause the sliver to be drawn and cut between the nip roll sets 3 and 4.

Figure 4:
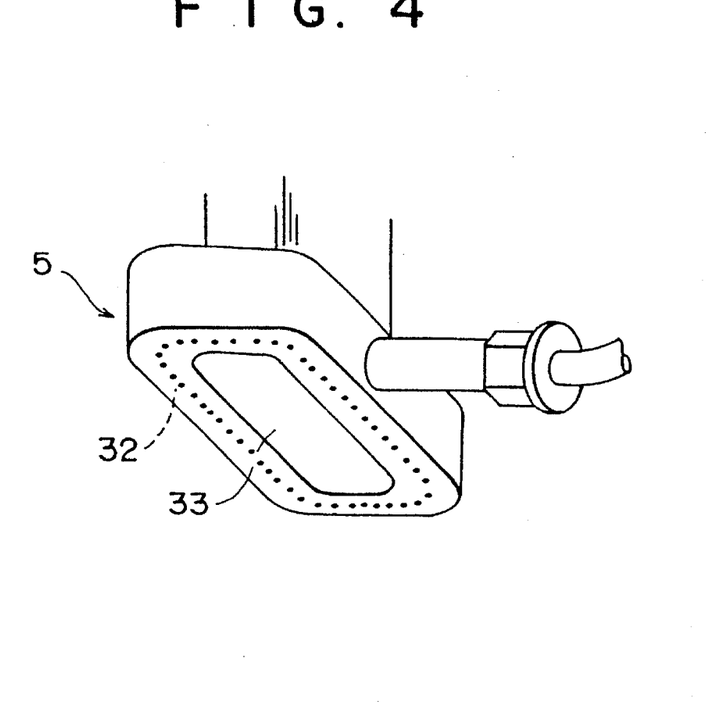
FIG. 4 is a perspective view of a tape-form nonwoven web guiding nozzle.

FIG. 4 is a perspective view of the ejective nozzle 5 mounted at lower end of the feeding means 6. Compressed air is ejected from fine orifices 32 perforated on the lower surface of the nozzle 5 and the jet of compressed air guides the cut sliver from a central opening 33 into the mold placed below the nozzle 5.

The sliver 1 is cut to a length corresponding to the length of a mold 7 by the cutting mechanism provided in the feeding means 6. As illustrated in FIG. 2, cut portions 8 of the sliver are laid sequentially on a molding surface 10 of the mold 7 by the ejective nozzle 5. In other words, the feeding means 6 conducts a to-and-fro movement, i.e., moves forward, backward, leftward and rightward, while scanning the molding surface 10 through the operation of the robot, to sequentially lay and superpose the cut portions 8 of sliver on the molding surface 10. The mold 7 is supported by a frame 21 which is a box-shaped casing open only at its side confronting the feeding means.

The cut portions 8 of sliver are laid on the molding surface 10 according to a specific design. To allow the cut portions 8 to be accurately placed in a predetermined position inside the mold, to prevent undesirable shifting of the laid cut portions 8 of sliver, to allow the bulky sliver to be readily superposed into a plurality of layers and also to prevent fall of the superposed cut portions 8 of sliver as the mold 7 is used a mold made of a structural material permeable to air is used as the mold 7, and air is sucked from the lower part inside the frame 21 supporting the mold 7 through a suction duct 9, so that a space on the backside of the molding surface 10 is kept under a reduced pressure. This sucking action allows the sliver superposed on the molding surface 10 to be reduced in thickness and readily fit and arranged on the molding surface 10. Effect of the suction is remarkable particularly when at least a part of the molding surface of the mold has a three-dimensionally curved surface.

Figure 5:
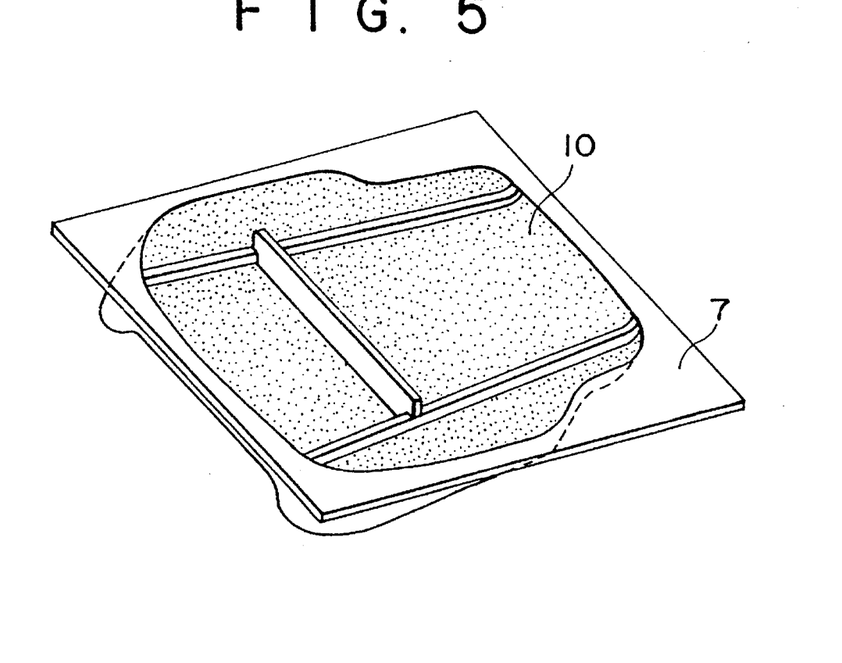
FIG. 5 is a perspective view of a mold.

It is preferable to cover the whole molding surface with a broad web made of a fibrous material which may be similar to the sliver before laying the sliver on the molding surface. This further prevents undesirable shifting of the sliver on the mold, and the web serves as a surface layer of an end product of molded cushion to provide an excellent surface finish of the product. FIG. 5 is a perspective view showing an example of the mold for use in the invention, wherein at least a part of the mold 7 corresponding to the molding surface 10 comprises a metal mold (e.g., aluminum die-cast) having a number of apertures or a molded form of an air permeable material such as punched plate or metal wire gauze.

Figure 6A:
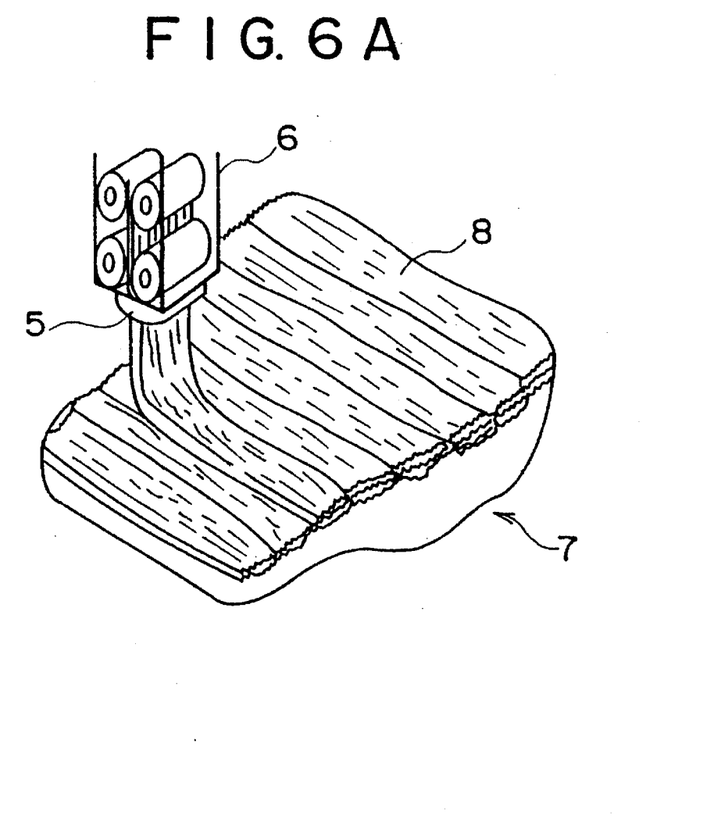
FIG. 6A is a perspective view illustrating the state of laying and superposing the tape-form nonwoven web on the mold surface.
Figure 6B:
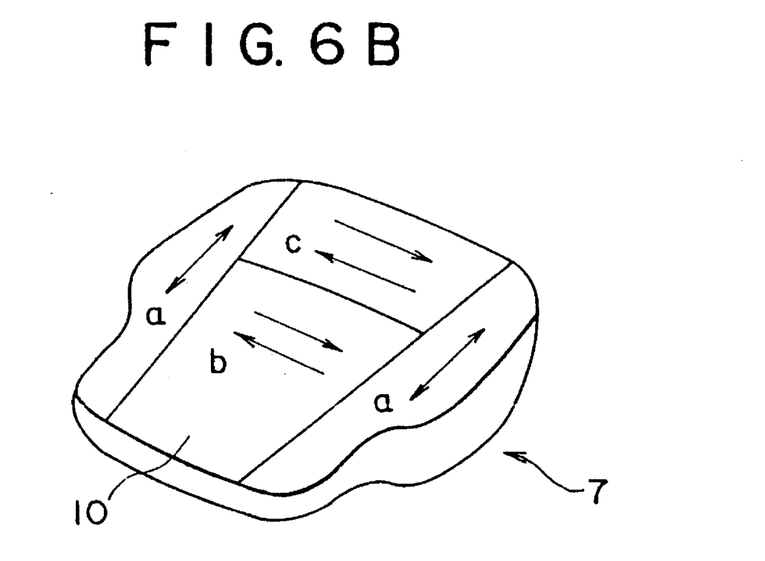
FIG. 6B is a drawing explaining the manner in which the tape-form nonwoven web is laid on the mold surface.

FIG. 6A shows a mode of sequentially laying the cut portions 8 of sliver on the molding surface of mold 7. According to the movement of the feeding means 6 based on a program designed, the cut portions 8 of sliver reciprocate to move forward and backward or leftward and rightward or in any composite directions thereof above the molding surface to be thereby laid and superposed thereon. Generally, a molded cushioning article is not a plate-shaped body having uniform thickness and density. Hence, the sliver is laid over the whole molding surface nonuniformly but in a manner such that a number of superposed layers of the sliver are provided to any specific parts of a desired molded cushioning article to have a higher density for the parts intended to be harder or for the part to be made swollen and massive. In contrast any parts of the cushion which are intended to be soft or not massive are provided with a small number of superposed layers of the sliver. Thus, the number of superposed layers of sliver can be varied correspondingly to a harder and soft part or a swollen and thin or recessed part of a molded cushioning article. For example, the areas a in FIG. 6B are given a larger number of superposed layers of sliver and the area b a smaller number of superposed layers. In addition to the number of layers of sliver, the directions of reciprocation of the feeding means 6 for laying the sliver can be freely changed depending on specific parts of a desired molded cushioning article, as in the areas a, b and c as shown by arrows in FIG. 6B. Also, the reciprocation directions of the feeding means can be freely changed in the midst of the molding process.

The positional correlation between the feeding means and the molding surface of the mold needs to be freely successively changeable, and such positional correlation changing means may be mounted on a stand (not shown) which supports the feeding means in a fixed state. Alternatively, the positional correlation changing means may be mounted on the frame or mold (not shown).

Upon placing the cut portions of sliver on the molding surface, a number of superposed layers of sliver may be formed locally as foregoing. The highly superposed layers in such areas are likely to fall. Hence, it is desirable to enhance the reduction of pressure on the backside of the molding surface with respect to those areas to have a large number of layers in comparison with other areas, thereby increasing the air-suction force.

Figure 7:
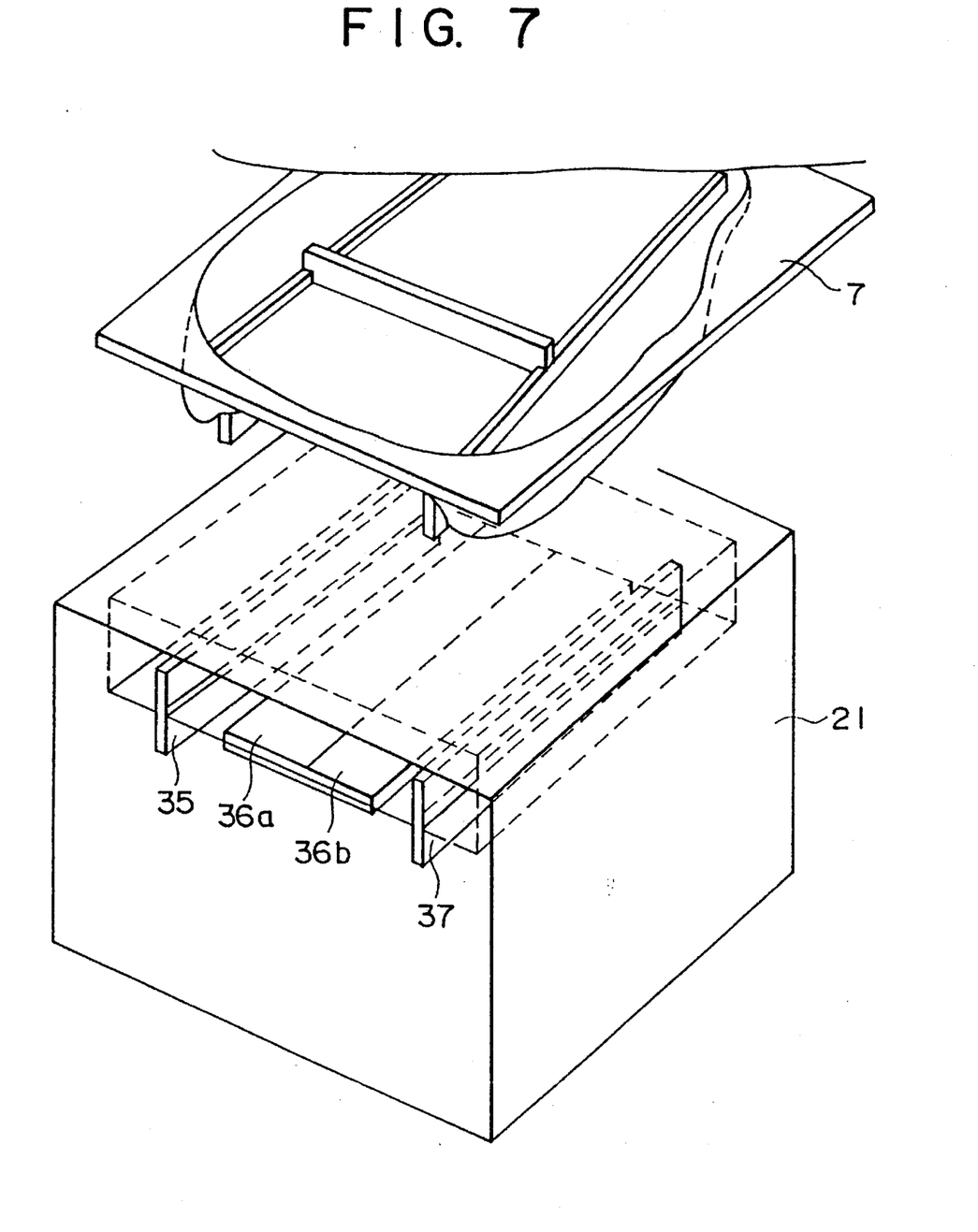
FIG. 7 is a perspective view of a device for locally changing reduced pressure at the backside of the molding surface of a mold.

FIG. 7 shows an example of a device for locally changing the reduced pressure on the backside of the molding surface of the mold. The reduced pressure changing device comprises four regulator plates 35, 36a, 36b, 37 for regulating air flow disposed under the mold 7, the regulator plates 36a, 36b being laid to extend in positions corresponding to the central area of the molding surface to shut the flow of suction air. The regulator plates 35 and 37 are arranged in a position corresponding to opposite end areas of the molding surface in a manner of not hindering the air flow. Hence, the air suction is relatively low at the central area of the molding surface and relatively high at the opposite end areas thereof.

Figure 8A:
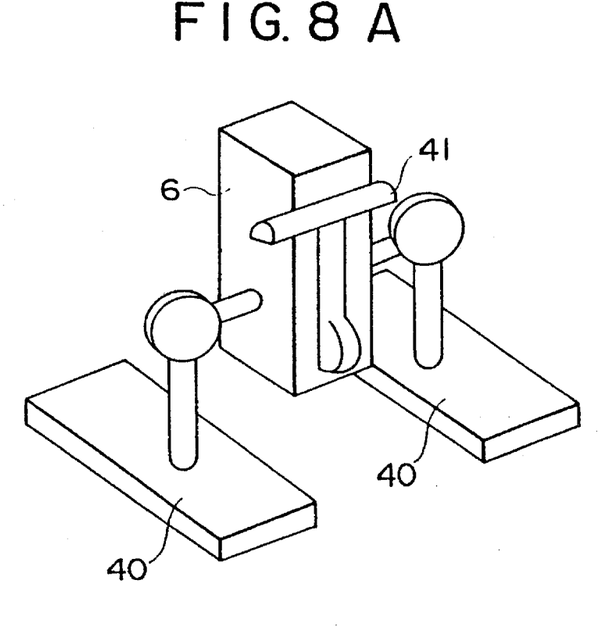
FIG. 8A and FIG. 8B show an auxiliary means for pressing down and forcing the tape-form nonwoven web into the mold.
Figure 8B:
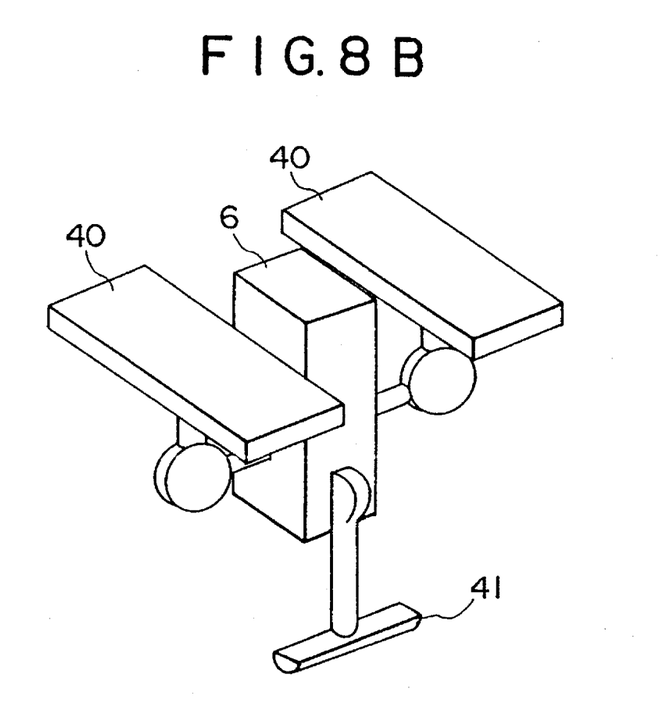

Since the highly superposed layers of sliver are likely to fall, it is preferable to press down the superposed layers in addition to increasing the air-suction as aforesaid. Also, specific molded cushioning article to be provided may have corners or projections into which the sliver is hard to be introduced. In this case, it is preferable to force the sliver into the corners or projections, etc during the molding process for providing a molded form for the desired molded cushioning article. FIGS. 8A and 8B show an example of an auxiliary device for that purpose which is mounted to the feeding means 6. FIG. 8A shows the state that pusher plates 40 mounted at both sides of the feeding means 6 are in the position for pressing down the superposed sliver layers. In this state, a pressing bar 41 is in a retracted position to be faced upward. FIG. 8B shows the state that the pusher plates 40 are turned upward to be in a retracted position while the pressing bar 41 turned downward to be in a position for pressing the superposed sliver layers into an aimed area. Turning upward and downward the pusher plates 40 and the pressing bar 41 are cyclically repeated in cooperation with the movement of the feed means 6 in accordance with a program designed for the movement of the robot.

Figure 9:
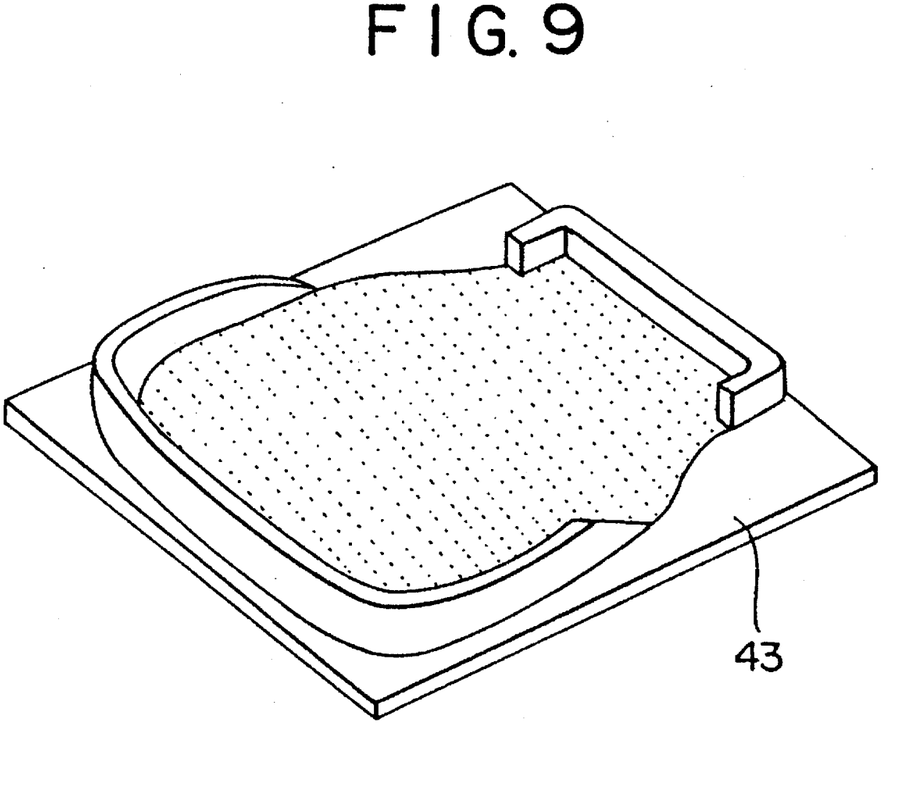
FIG. 9 is a perspective view of a pressing mold lid to be placed on the molded form.

When a predetermined amount of sliver is superposed on the molding surface of the mold, molding of the superposed sliver is completed to obtain a molded form of the shape substantially corresponding to the molding surface. Upon completion of the molding, a pressing mold lid 43 as shown in FIG. 9 is usually placed on the molded form of sliver and the mold together with the molded form are removed from the frame supporting the mold. It is preferable to apply, before placing the pressing mold lid on the molded form, a reinforcing supporting member made of a relatively rigid sheet-form fibrous material on a surface of the molded form which will serve as a rear face of as resulting molded cushioning article (i.e., on the surface to receive the pressing mold lid 43). The reinforcing supporting member ,lay be a needle-punched web containing a binder. In FIG. 9, the pressing mold lid 43 is illustrated with its surface to contact with the molded form positioned lower. The pressing mold lid 43 may preferably comprise a metal mold, e.g., aluminum die-cast, having a number of apertures or a molded form of air-permeable materials such as metal gauze or a punched plate so as to allow hot air to readily flow into the molded form upon heat-treatment.

The molded form of sliver sandwiched between the mold and the pressing mold lid is then subjected to heat-treatment by a hot oven to melt portions of fibers constituting the molded form of sliver so as to fusion-bond the fibers among others at intersecting points, thereby obtaining a desired molded cushioning article.

Figure 10:
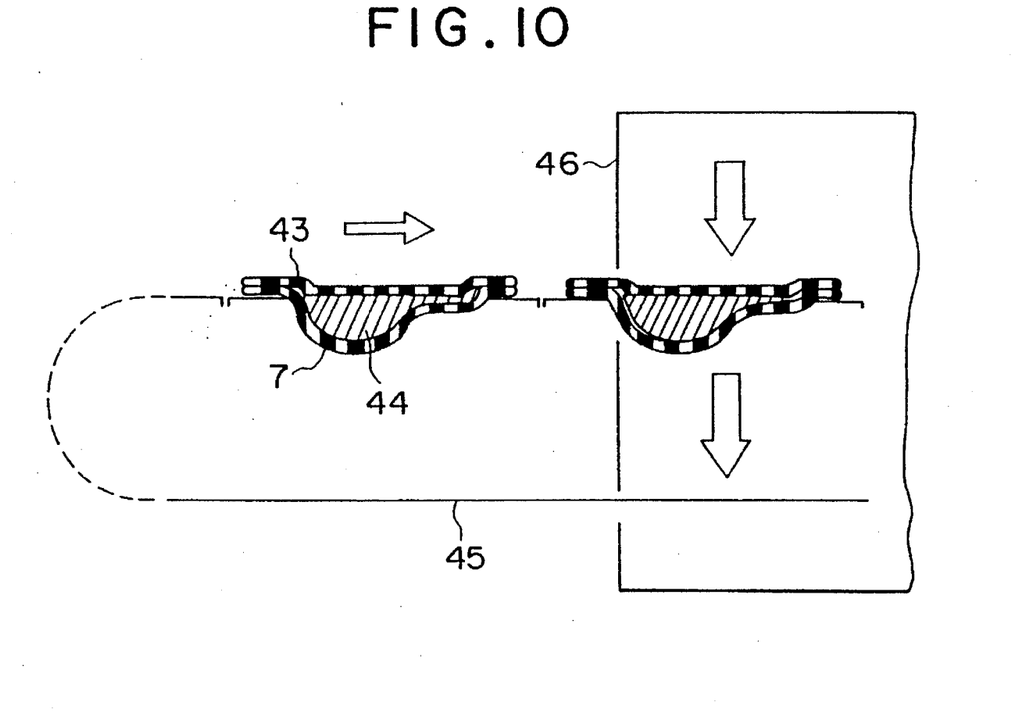
FIG. 10 is an explanatory view showing a process for heat-treating the molded form of a tape-form nonwoven web by using a hot oven provided therein with a conveyor.
Figure 11:
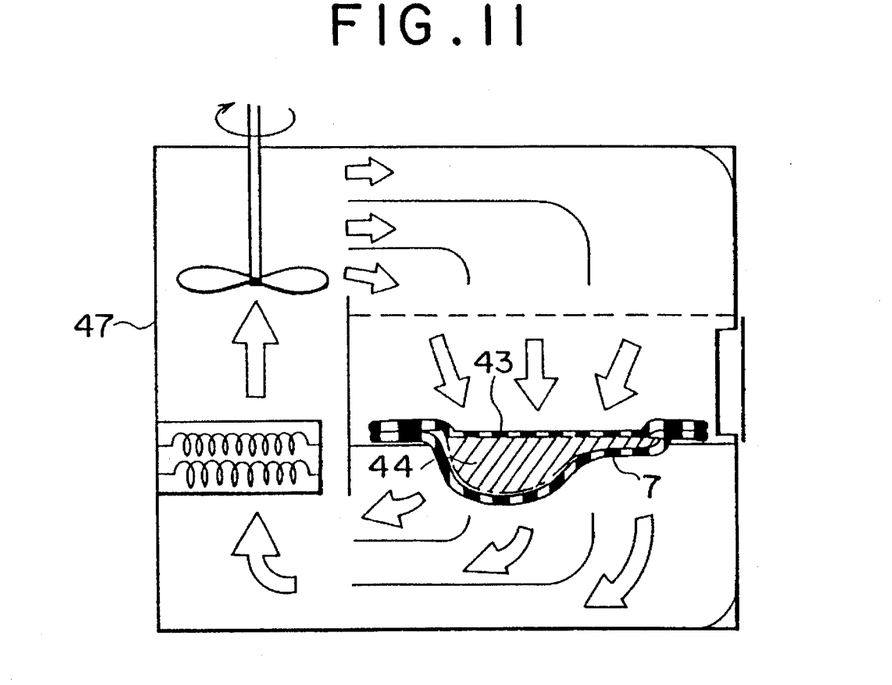
FIG. 11 is an explanatory view showing a process for heat-treating the molded form of a tape-form nonwoven web in a hot-air oven.

FIG. 10 and FIG. 11 show a hot-air oven using hot air for effecting a heat-treatment to the molded form of sliver sandwiched between the mold and the pressing mold lid. As seen from FIG. 10, molded forms 44 in the state of being sandwiched between the mold 7 and the pressing mold lid 43 are sequentially transferred to the hot-air oven 46 by a conveyor 45 and heat-treated. Also preferable is a hot-air oven 47 as shown in FIG. 11 wherein the subjects are left at rest and hot air is forced to circulate as shown by arrows. Since the mold 7 and the pressing mold lid 43 are made of air-permeable materials, hot air can readily enter the inside of molded form to make a faster temperature rise in the molded form, thereby enabling the time for heat-treatment to be shortened.

Figure 12A:
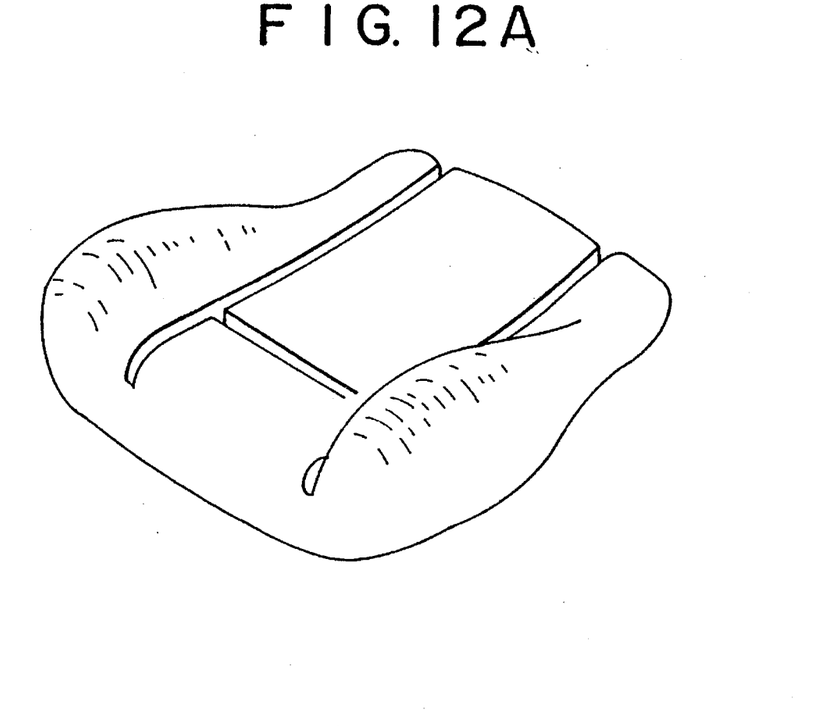
FIG. 12A is a perspective view showing an appearance of a molded cushioning article.
Figure 12B:
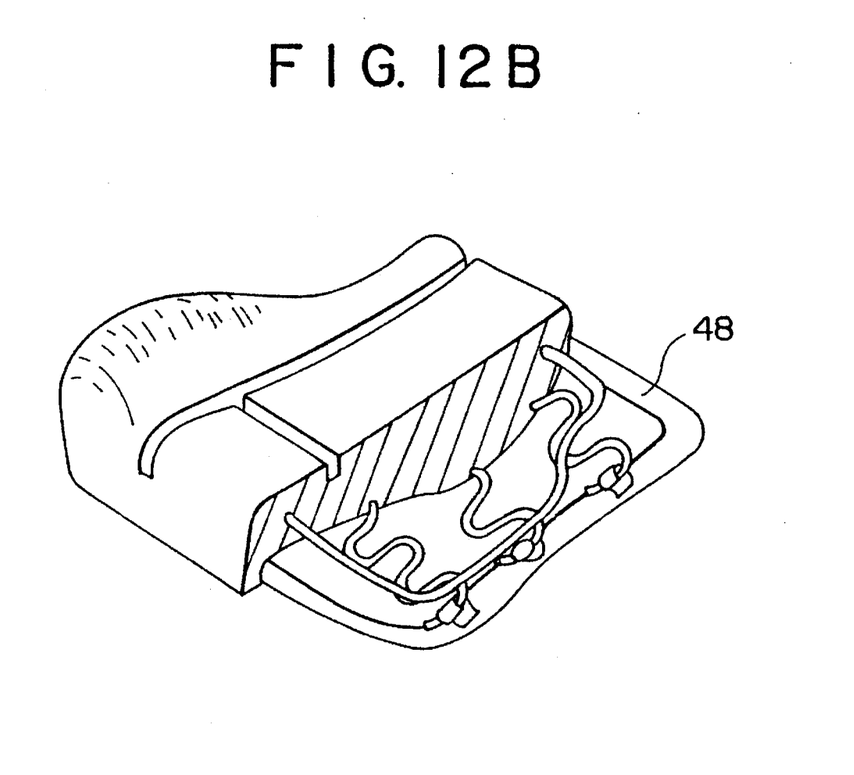
FIG. 12B is a partially exploded view showing a structure of a molded cushioning article.

FIG. 12A is a perspective view showing an example of a molded cushioning article obtained by the methods and apparatuses according to time present invention, and FIG. 12B shows the molded cushioning article provided with a reinforcing and supporting frame 48. It should be noted that time molded cushioning article is not to be limited to the shown feature and can be embodied into various configurations.

The molded cushioning article, which is resilient against compression in the thickness direction, has a thickness of at least 5 mm or more, preferably 10 mm or more, and more preferably 20 mm or more to show the function. The thickness of the molded cushioning article is generally in the range of 5 to 100 mm but may be about 1 to about 2 m on rare occasions.

Next, time properties and features of the fiber aggregate represented by a sliver used in the present invention will be detailed.

The sliver preferably has a bulkiness of 30 to 100 cm$^3$/g. When the bulkiness thereof is lower than 30 cm$^3$/g, borders of the slivers and their layers superposed and molded in the mold are weaker than the rest, deteriorating the durability of the products. Also, in case that the bulkiness of the sliver is low, when it is superposed in the mold to have a hard part and a soft part by varying time density of sliver, the low density part is not well formed, so that a resultant molded cushioning article is substantially limited of obtainable hardness. Furthermore, the layers of sliver are likely to have gaps between time layers, such gaps would not be eliminated when pressing down, and time wadding is hard to be packed into a narrow part, corners or the like in the mold even by pressing down the sliver. These parts are apt to cause problems in product quality or compression durability. In contrast, in case that bulkiness of the sliver is higher than 100 cm$^3$/g, the sliver when placed in the mold exhibits a poor handling efficiency and is hard to be arranged in position, thereby deteriorating the accuracy of hardness in specific parts of the molded product. When the sliver is made higher in density for obtaining hard parts of cushion, the height of the superposed sliver layers becomes too high and, thus, the superposed layers in the hard parts are easily fallen in the course of superposing operation in other parts.

The bulkiness of sliver is measured in the following manner. The sliver is cut to a length of 14.1 cm, arranged side by side to have a total width of 14.1 cm, and layered with major sides of flat sections of the cut portions of sliver being sidewise with no gaps among the cut portions to form a layered body weighing 1000 g/m$^2$. Then, a load plate of 5 g/cm$^2$ is put on the layered body followed by leaving to stand for 30 sec and, after removing the load, further for 30 sec. Applying and releasing load by the load plate is repeated three times, and thereafter, the thickness of the layered body having thereon a load plate of 0.5 g/cm$^2$ is measured to calculate the bulkiness thereof (g/cm$^3$).

The sliver used in the present invention preferably has a width/thickness ratio of 2 to 10. The width/thickness ratio of a sliver for use in spinning which is obtained by passing a web from a common card through a trumpet having a small circular aperture is about 1.5. In case that the ratio is less than 2, the sliver when arranged in the mold easily rolls to shift from a predetermined position, or the sliver when superposed in the mold have gaps between the layers and will include any parts laving less amount of fibers among the layers of sliver even after molding. Alternatively, in case that the width/thickness ratio is higher than 10, the sliver stored for feeding is hard to be drawn out due to licking or the like, the sliver is easily torn to thereby cause troubles in feeding, or the sliver is apt to be hard to be arranged in narrow areas on the molding surface.

In determining the width/thickness ratio of the sliver, the thickness is measured with major sides of flat sections of the sliver being sidewise and the sliver being applied with a load of 0.3 g/cm$^3$. The width is measured by use of a scale in a manner such that the sliver is placed on a plane without being twisted and the scale is applied in the width direction of the sliver without pressing the same. The width/thickness ratio of the sliver is calculated based on the measured width and thickness.

As foregoing, the fiber aggregate represented by the sliver preferably employs a mixture of a crimped staple fiber serving as a matrix and a heat-bondable staple fiber which comprises a polymer having a melting point lower than that of a polymer constituting the crimped staple fiber.

The crimped staple fiber serving as matrix is not limited to any type but may use crimped staple fibers which can be made into a sliver by an opener or a card. They may be of natural fibers, semi-synthetic fibers, or synthetic fibers. In view of the bulkiness and durability of the cushioning article, a polyester polymer fiber is preferable, and particularly preferable are fibers of polyethylene terephthalate, polybutylene terephthalate, or poly-1,4-dimethylcyclohexane terephthalate, fibers of a copolyester thereof and conjugate fibers made from these polymers.

The fineness of the crimped staple fibers is preferably 2 to 500 deniers and more preferably 6 to 200 deniers. When the fineness is smaller than 2 deniers, a resultant sliver does not have a sufficient bulkiness, so that the sliver when molded shows clear borders among the cut portions of sliver with poor evenness and time border parts are weak to deteriorate the durability of a resultant cushioning article. Also, when time fineness is higher than 500 deniers, the number of constituent fibers is reduced, so that time sliver is hard to have a satisfactory bulkiness, has a marked problem in respect of evenness similarly to the above, and is extremely made lower in tensile strength, resulting in a problem in handling. The crimped staple fibers may be cut to any length enough to form the sliver material but may preferably be 38 to 255 mm. When the cutting length is too small, a resultant sliver does not offer a satisfactory strength and has a poor handling efficiency. In contrast, when the cutting length is too large, it causes troubles in manufacturing the sliver, to be described later.

The number of crimps in the crimped staple fiber is preferably 4 to 25/in. When it is too small, a resultant sliver hardly has a sufficient bulkiness and the tensile strength becomes low, resulting in a poor handling efficiency. When the number of crimps is too large, it becomes difficult to make a sliver, slivers when molded are poor in entanglement among others and borders among the slivers are fragile, resulting in a poor durability.

In the present invention, the heat-bondable staple fibers which comprise a polymer having a melting point lower than that of a polymer constituting the crimped staple fibers serving as matrix are used. These are staple fibers which, when heated, are fusible at least at a part of their surfaces to fusion-bond to the crimped staple fibers or to each other. In this case, the difference in melting point between the polymer constituting the crimped staple fibers and the lower melting-point polymer is preferably at least 40° C. When the difference in melting point is less than 40° C., the temperature for processing needs to be set near the melting point of crimped staple fiber, so that the physical properties and crimp property of the crimped staple fiber are lowered to deteriorate the cushioning efficiency, and the crimped staple fiber when molded has a large shrinkage.

Such heat-bondable fibers include, for example, copolyester fibers, fibers containing a thermoplastic elastomer, polyolefin fibers and polyvinyl alcohol fibers. A conjugate fiber containing the above lower-melting-point polymer as at least one component is preferable since it is superior in stability in shape-keeping and moldability. Preferable types of conjugation are side-by-side type, core-and-sheath type and eccentric core-and-sheath type. Most preferable is the eccentric core-and-sheath type, since the conjugation of such type produces a coil-form crimp.

Where the cushioning article is used in a manner such that it is repeatedly deformed by compression after fusion-bonding and molding, and where the amount of compression, or deformation is large (e.g., 50% of the thickness thereof), it is necessary to allow fusion-bonded points of cushion to be readily deformed when deforming stress is applied and readily return to the original position thereof without deformation when deforming stress vanishes. When the molded cushioning article is deformed to a large extent, the intersecting points of fibers constituting the fibers structure are deformed at larger angles and, hence, the fusible polymer needs properties of largely recovering from deformation. Hence, the fusible polymer is preferably composed of a thermoplastic elastomer, particularly, a polyester elastomer which has a good heat-resistance, in view of the fact that the fiber is thermoformed and that a matrix fiber to be fusion-bonded with the fusible polymer is preferably a polyester fiber.

In detail, a preferable conjugate fiber used for forming the heat-bondable points is formed of a thermoplastic elastomer and a non-elastic polyester. In this case, the former preferably occupies at least ½ of the fiber surface of the conjugate fiber. A proper weight ratio of the former to the latter in the conjugate fiber is in the range of 30/70 to 70/30.

Preferable as the thermoplastic elastomer are a polyurethane elastomer and a polyester elastomer.

The polyurethane elastomer includes polymers prepared by reaction of a low-melting-point polyol having a molecular weight of about 500 to about 6,000, such as dihydroxy-polyether, dihydroxy-polyester, dihydroxy-polycarbonate or dihydroxy-polyester-amide, an organic diisocyanate having a molecular weight of not larger than 500, such as p,p'-diphenylmethane diisocyanate, tolylene diisocyanate, isophorone diisocyanate, hydrogenated diphenylmethane diisocyanate, xylylene diisocyanate, 2,6-diisocyanate methyl caproate or hexamethylene diisocyanate, and a chain extending agent having a molecular weight of not larger than 500, such as a glycol, an amino alcohol or a triol. Particularly preferable among these polymers is a polyurethane using, as polyol, polytetramethylene glycol, poly-$\epsilon$-caprolactone or polybutylene adipate. Preferable as the organic diisocyanate is p,p'-diphenylmethane diisocyanate, and as the chain extending agent are p,p'-bishydroxyethoxybenzene and 1,4-butanediol.

The polyester elastomer includes polyether ester block copolymers prepared by copolymerization using a thermoplastic polyester as a lard segment and a poly(alkylene oxide) glycol as a soft segment. More specifically, the polyester elastomer includes terpolymers comprising at least one kind of dicarboxylic acid selected from aromatic dicarboxylic acids such as terephthalic acid, isophthalic acid, phthalic acid, naphthalene-2,6-dicarboxylic acid, naphthalene-2,7-dicarboxylic acid, diphenyl-4,4'-dicarboxylic acid, diphenoxyethane dicarboxylic acid, or sodium 3-sulfoisophthalate, an alicyclic dicarboxylic acid such as 4-cyclohexane-dicarboxylic acid, an aliphatic dicarboxylic acid such as succinic acid, oxalic acid, adipic acid, sebacic acid, dodecane diacid or dimer acid, or an ester-forming derivative of these dicaboxylic acids, at least one kind of diol component selected from aliphatic diols such as 1,4-butanediol, ethylene glycol, trimethylene glycol, tetramethylene glycol, pentamethylene glycol, hexamethylene glycol, neopentyl glycol or decamethylene glycol, an alicyclic diol such as 1,1-cyclohexanedimethanol, 1,4-cyclohexanedimethanol or tricyclodecanedimethanol or an ester-forming derivative of these diols, and at least one kind of poly(alkylene oxide) glycol laving an average molecular weight of 400 to 5,000, such as a polyethylene glycol, a poly (1,2- and 1,3-propylene oxide ) glycol, poly(tetramethylene oxide) glycol or copolymer of ethylene oxide and propylene oxide, or a copolymer of ethylene oxide and tetrahydrofuran.

However, in view of adhesion with the crimped staple fibers of non-elastic polyester, temperature properties, and strength, a polyether polyester block copolymer having polybutylene terephthalate as a lard segment and polyoxybutylene glycol as a soft segment is preferably used. In this block copolymer, polyester portion forming the lard segment is polybutylene terephthalate containing terephthalic acid as a main acid component and butylene glycol as a main diol component. The acidic component may be partially (e.g., 30 mol % or less) substituted with other dicarboxylic acid component or hydroxycarboxylic acid component, and the glycol component may also be partially (e.g., 30 mol % or less) substituted with dihydroxy component other than butylene glycol. The polyether portion forming the soft segment may be a polyether substituted with a dihydroxy component other than butylene glycol.

The polymer may be blended with various stabilizing agents, ultraviolet absorbents, branching agents for increasing viscosity, delustering agents, coloring agents and other modifiers, if desired.

Degree of polymerization of the polyester elastomer is preferably 0.8 to 1.7, especially 0.9 to 1.5 as expressed in terms of intrinsic viscosity. When the intrinsic viscosity is too low, the heat-bondable points formed by the elastomer and the non-elastic polyester crimped staple fiber constituting matrix are likely to be destroyed.

As basic properties of the thermoplastic elastomer, elongation at break defined later is preferably 500% or more and more preferably 800% or more. In case that the elongation at break is too low, when a molded cushioning article is compressed and deformed, the heat-bonded points, become easily destroyed.

The thermoplastic elastomer preferably has a stress of 0.8 kg/mm$^2$ or less, more preferably 0.6 kg/mm$^2$ or less, at an elongation of 300%.

When the stress is too high, the heat-bonded points are hard to disperse a force applied to the molded cushioning article so that when the cushion is compressed, the heat-bonded points are likely to be destroyed by the compressing force, or otherwise the crimped staple fibers of non-elastic polyester constituting the matrix may be distorted, or undone of crimp.

The thermoplastic elastomer preferably has recovery of 60% or more, more preferably 70% or more at an elongation of 300%. When the recovery is low, a molded cushioning article when compressed to deform the heat-bonded points is unlikely to return to the original state.

The thermoplastic elastomer must have a melting point lower than that of the polymer constituting the crimped staple fiber of non-elastic polyester and not to thermally damage the crimp of the crimped staple fiber upon fusion-bonding process for forming the heat-bonded points. In this regard, the melting point of the thermal elastomer is preferably lower by 40° C. or more, particularly 60° C. or more than that of the polymer constituting the crimped staple fiber. The melting point of the thermoplastic elastomer may be in the range 130° to 220° C.

When the difference in melting point is less than 40° C., the temperature for heat-treatment upon fusion-bonding process described hereunder is too high, thereby causing damage of the crimp of the crimped staple fiber of nonelastic polyester and deteriorating the mechanical properties of the crimped staple fiber. In case that specific melting point of thermoplastic elastomer is not clearly observed, the melting point is represented by the softening point.

As the non-elastic polyester used together with the above thermoplastic elastomer is used a polyester polymer constituting the crimped staple fiber forming matrix as foregoing, preferably, polybutylene terephthalate.

Physical properties of the above polymer were measured in the following manner.

Measurement of physical properties of thermoplastic polymer (1) Preparation of film for measurement The thermoplastic polymer was melted in a nitrogen atmosphere at 300° C. After deaeration, the polymer was calendered at 20 m/min and 100° C. by using a pair of metal rollers with clearance of 0.5 mm to obtain a film having a thickness of about 0.5 mm. Tile film was punched to prepare samples having a width of 5 mm and a length of 50 mm to be used for measuring physical properties of the thermoplastic polymer.

(2) Measurement of elongation at break

Breaking elongation was measured on a sample film having a length of 50 mm at a stretching speed of 50 mm/min.

(3) Measurement of stress at 300% elongation

A sample film having a length of 50 mm was stretched to 400% of the original length at a stretching speed of 50 mm/min. Measured stress was divided by the initial sectional area (thickness×width) of the sample and an obtained value was regarded as a stress at 400% elongation (kg/mm$^2$).

(4) Measurement of recovery at 300% elongation

A sample film having a length of 50 mm was stretched to 400% of the original length at a stretching speed of 50 mm/min followed by causing the sample to return to zero point at a speed of 50 mm/min. After leaving to stand for 2 min, the sample was stretched again at a speed of 50 mm/min. Relaxed length (mm) of the sample was obtained from the initial rise in stress and the rise in stress after leaving to stand (2 g stress), and a ratio (%) of relaxed length to an elongation of 150 mm was calculated from the formula [(1-relaxed length)/150]×100 (%). The calculated value was regarded as a recovery at 300% elongation.

(5) Melting point

Peak temperature of melting point was obtained by measuring the melting point using a differential thermal analyzer model 990 supplied by Du Point at a temperature elevation rate of 20° C./min.

(6) Softening point

Using a micro melting point measuring device supplied by Yanagimoto Seisakusho, about 3 g of a polymer is sandwiched between two cover glasses and while gently pressed by forceps, the polymer was heated at a temperature elevation rate of about 10° C./min. Thermal change of the polymer was observed. The lowest temperature at which the softening and flowing of the polymer occurred was regarded as the softening point.

The foregoing conjugate fiber is incorporated in an amount of 10 to 70% by weight preferably 20 to 60% by weight, based on the weight of a resultant molded cushioning article. When the incorporation ratio is too low, the heat-bondable points are reduced in number, so that the molded cushioning article is easily deformed and has poor elasticity, repulsion and durability. When the incorporation ratio is too high, the number of the crimped staple fibers of non-elastic polyester providing repulsion property is largely reduced and a resultant cushioning article lacks repulsion efficiency.

The crimped staple fibers of non-elastic polyester and the elastic conjugate fibers call be made by known spinning methods. Polymers, thickness of staple fibers and mixing ratio of these fibers, etc. are as explained above. These fibers are preferably stretched at least 1.5 times of the original length after spinning. A molded cushioning article composed of the stretched fiber is superior in resistance to those composed of unstretched fibers and is not readily flattened. This is so inferred that when the fibers are stretched, cut to staple fibers and relaxed, amorphous portions are loosened to become random, thereby forming a fiber structure further superior in elasticity and which feature is readily kept even after fusion-bonding. Also, the elastic conjugate fiber preferably has a low heat shrinkability. In case that the heat shrinkability is high, thermoplastic elastomer largely shrinks before melting upon heat-bonding process, so that conversion of the intersecting points to the fusion-bonded points is reduced. To lower the heat shrinkability of the elastic conjugate fibers, the fibers may be heat-treated at 40° C. to 120° C. for at least 20 sec after the stretching step.

Stuffing crimping is sufficient to impart crimp to staple fibers. The number of crimps is preferably 5 to 15/in and more preferably 8 to 12/in, as measured by JIS-L-1015. Alternatively, the fibers when spun are preferably given anisotropy in the fiber structure by anisotropic cooling or the like to have latent crimpability, and further subjected to the stuffing crimping.

The molded cushioning article manufactured by the method and apparatus according to the present invention can be freely and locally varied of density and of shape, has an improved fitting efficiency to human body or other objects of complicated shapes and load-supporting efficiency, has an ideal compression property as being soft initially when compressed and as having an increasing resistance to an increase in compression, and is superior in compression durability. Further, the cushioning article has a good permeability to air and does not feel stuffy. The molded cushioning article can be manufactured in a favorable working environment without causing change in processability, but with high productivity.

What is claimed is:

1. An apparatus for molding a bulky sliver into a molded form having a shape corresponding to a cavity of a mold, the sliver having a bulkiness of 30 to 100 cm$^3$/g and a section modulus K, as defined by the formula: K=W/D, where W is a width of the sliver and D is a thickness of the sliver, of 2 to 10, which comprises:

(a) feeding means for draw-cutting the sliver into a short length and feeding the thus-cut sliver into a cavity of a mold; said feeding means comprising at least two sets of nip rolls spaced from each other in the feeding direction of the sliver, wherein a first set of nip rolls at the upstream side is capable of being intermittently reduced in the surface velocity or stopped with respect to the other set of nip rolls at the downstream side, (b) the mold having a molding surface, wherein at least a part of the molding surface is three-dimensionally curved, which is made of a structural material permeable to air and is positioned below the sliver-feeding means, (c) a frame supporting the air-permeable mold, (d) suction means provided in the frame for keeping a space on a backside of the molding surface of the air-permeable mold under a reduced pressure for holding the sliver fed to the mold, and (e) means for successively changing a relative position between the sliver-feeding means and the molding surface of the mold.

2. The apparatus for molding the sliver as set forth in claim 1, wherein the sliver-feeding means is fixed on and supported by an arm of a robot through a supporting for said sliver-feeding means.

3. The apparatus for molding the sliver as set forth in claim 1, wherein the mold is made of a punched plate as the air-permeable structural material.

4. The apparatus for molding the sliver as set forth in claim 1, wherein the mold is made of a metal wire gauze as the air-permeable structural material.

5. The apparatus for molding the sliver as set forth in claim 1, wherein the mold is a metal mold having a number of perforations.

6. The apparatus for molding the sliver as set forth in claim 1, wherein the frame is a box-shaped casing which is open only at its side confronting the feeding means.

7. The apparatus for molding the sliver as set forth in claim 1, wherein said means for successively changing the relative position is mounted on a stand which supports the feeding means in a state fixed to the stand.

8. The apparatus for molding the sliver as set forth in claim 1, wherein the sliver-feeding means further comprises an ejecting nozzle for guiding the sliver, which has been cut to a short length, into the cavity of the mold, said ejecting nozzle being mounted at the lower end of the sliver-feeding means.

* * * * *